July 25, 1950     H. S. McCULLOUGH     2,516,582
AUXILIARY LENS ATTACHMENT FOR TWIN LENS CAMERAS
Filed June 11, 1947
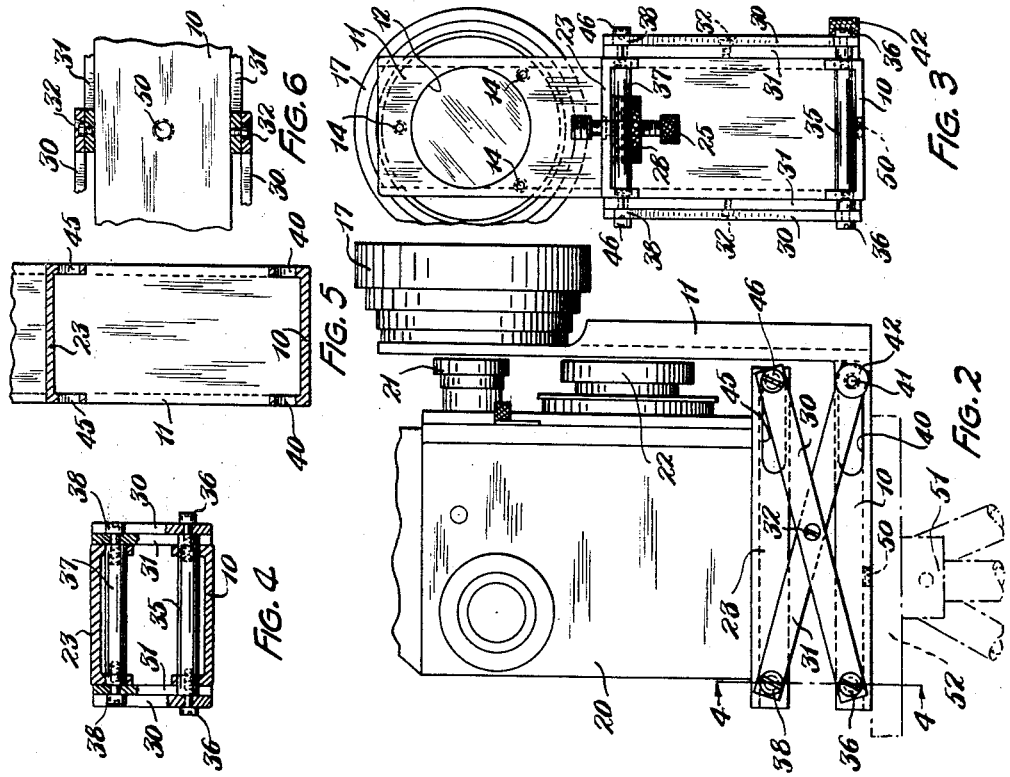
INVENTOR.
HOMER S. McCULLOUGH
BY
Kwis, Hudson, Boughton & Williams
ATTORNEYS Patented July 25, 1950

2,516,582

UNITED STATES PATENT OFFICE 2,516,582

AUXILIARY LENS ATTACHMENT FOR TWIN LENS CAMERAS

Homer S. McCullough, Cleveland, Ohio

Application June 11, 1947, Serial No. 753,944

5 Claims. (Cl. 95—44)

This invention relates to improvements in cameras, more particularly cameras of the twin lens reflex type. The invention has to do with mounting the camera upon a bracket and shifting the camera and bracket relatively to each other through a distance corresponding to the distance between the axes of the focusing and taking lenses. When the bracket is held in a fixed position, as by attachment to a tripod, the camera may be lowered relative to the bracket to compose the picture and then shifted to its uppermost position to make the exposure, thus completely overcoming parallax. Secondly, with the bracket thus held in fixed position and an auxiliary lens mounted in a vertical leg of the bracket so that either the focusing or the taking lens may be aligned with the auxiliary lens, the camera may be shifted to its down position for focusing and composing the picture and then returned to its upper position for taking the picture. Auxiliary lenses of different focal lengths may be applied interchangeably, thereby enabling the user to employ the camera for close-up work or for obtaining telephoto effects.

One of the objects of the invention therefore is the provision of means for overcoming parallax.

Another object is the provision of means that is rapidly operable for utilizing a single auxiliary lens for focusing and making exposures in a twin lens reflex camera.

Another object is the provision of means for shifting the camera up or down behind an auxiliary lens held in fixed position to both focus and compose the picture before exposing the film.

Other objects and features of novelty will appear as I proceed with the description of that embodiment of the invention which, for the purposes of the present application, I have illustrated in the accompanying drawing, in which Fig. 1 is a side elevational view of a twin lens reflex camera equipped with my invention, the camera being positioned with its taking lens behind the auxiliary lens.

Fig. 2 is a fragmental view similar to Fig. 1 but with the camera lowered to position its focusing lens behind the auxiliary lens.

Fig. 3 is a vertical sectional view taken substantially on the line 3—3 of Fig. 1.

Fig. 4 is a vertical sectional view taken substantially on the line 4—4 of Fig. 2, the camera being removed.

Fig. 5 is a vertical sectional view taken substantially on the line 5—5 of Fig. 1, and Fig. 6 is a fragmental horizontal sectional view taken substantially on the line 6—6 of Fig. 1.

In carrying out the invention I employ an angle bracket having a horizontal leg 10 and a vertical leg 11. Both legs of this bracket are preferably channel shaped in cross-section thereby promoting rigidity. The vertical leg 11 is provided near its upper end with a circular opening 12, and upon this leg surrounding opening 12 there is mounted by suitable means, such as screws 13 extending into tapped holes 14 in the leg 11, a flanged ring 15 adapted to receive an auxiliary lens 16. The latter is held in place removably by a retaining ring 17 which is illustrated as a lens shade. The lens 16 is thus interchangeable with others of different design, so that the effective focal length of the camera lenses may be changed through a wide range.

A reflex camera is indicated generally at 20. As is conventional in cameras of this type there is a focusing lens 21 and a taking lens 22 of identical focal length. Suitable means for moving these lenses simultaneously inwardly and outwardly for focusing purposes is provided, but not illustrated herein.

For convenience in applying the invention to cameras of different manufacture, I attach to the base of the camera a plate 23 which may be of the same channel shape cross-section as the legs 10 and 11 of the bracket. In cameras of the reflex type it is conventional practice to provide a tripod socket in the base of the camera, such a socket being illustrated at 24 in Fig. 1 of the drawing. I attach plate 23 to the camera by means of a screw 25 entering the socket 24 and extending through a slot 26 longitudinally disposed in plate 23, in order that the camera may be so located that its lenses 21 and 22 will stand just behind the vertical leg 11 of the bracket when the lenses are in their forwardmost position. A washer 27 bridges the slot 26 and is clamped against the underside of plate 23 by a collar 28 threaded upon the screw 25. The camera is thus rigidly mounted upon the plate 23, and the plate in effect becomes a part of the camera.

Operative connections are provided between the plate 23 and the horizontal leg 10 of the bracket for permitting the operator to shift the camera up and down between the positions illustrated in Figs. 2 and 1, while maintaining the plate 23 in parallelism with the leg 10. A convenient means for this purpose is illustrated in the drawing, where two pairs of crossed arms 30 and 31 are pivoted together by screws 32, each screw having a threaded mounting in the arm 31 and a journal mounting in the arm 30.

A tubular pin 35 has rotary bearing in holes formed in the upturned flanges at the rear end of horizontal leg 10 of the bracket, the ends of this pin abutting the two arms 30. Headed screws 36 extend through smooth holes in the arms 30 and are threaded into the ends of the pin 35. A pivotal connection between the arms 31 and the rear end of plate 23 is similar to that just described, except that the tubular pin 37 extends only through the downturned flanges of the inverted channel 23 and abuts the ends of the arms 31, screws 38 extending through smooth holes in the arms 31 and being threaded into the ends of the pin 37, all as shown in Fig. 4 of the drawing.

At the forward end of the horizontal leg 10 of the bracket each of its upturned flanges is provided with a longitudinal slot 40. A pin extends through these two slots 40 and is rotatably mounted in holes in the forward ends of the two arms 31. One end of this pin is headed to engage the outer surface of one of the arms 31, while at the other end it is provided with a reduced and threaded extremity 41 which receives a knurled nut 42. When the latter is turned down tightly the arms 31 are clamped to the horizontal leg 10 of the bracket and the parts are thereby secured against accidental movement.

The forward ends of arms 30 carry a similar cross-pin which runs in slots 45 and has reduced ends rotatably mounted in holes in the arms, screws 46 being threaded into the pin and having heads engaging the outer surfaces of the arms.

The slots 40 and 45 are so disposed and proportioned that when the camera is in its lowermost position with the focusing lens 21 aligned with the auxiliary lens as in Fig. 2, the forward pivot pins will bear against the forward ends of the slots, while when the camera is raised to bring its taking lens 22 into alignment with the auxiliary lens as in Fig. 1, the pivot pins will bear against the rear ends of the slots. When the camera is in the position of Fig. 2 the knurled nut 42 need not necessarily be tightened, as gravity will hold the camera in this position. When the camera is raised to the position of Fig. 1 however, the nut 42 must be tightened in order to hold the camera in that position. A length of slots 40 and 45 is selected such that vertical movement equal to the distance between the axes of lenses 21 and 22 will be permitted. This length may vary for cameras of different manufacture.

In order that the bracket 10, 11 may be fixed in position conveniently, I provide a tripod socket 50 in the horizontal leg of the bracket. In the drawing I have indicated a tripod 51 having a small table 52 through which the tripod screw may project for securing the bracket in position firmly.

The operation of a camera equipped with my invention will be obvious to those skilled in the art. With the bracket mounted upon a tripod and the camera in the position of Fig. 2, the lens 21 modified by the auxiliary lens may be focused upon the object to be photographed and the picture may be composed by movements of the tripod or of the tripod head until the image desired shows upon the ground glass. Then the camera may be raised by applying lifting force to it until the forward pivot pins engage the rear ends of the slots 40 and 45, when the knurled nut 42 is tightened to hold the camera in the position of Fig. 1, that is with the taking lens axially aligned with the supplemental or auxiliary lens 16. Nut 42 is then tightened, after which the exposure may be made. Manipulation is convenient and rapid.

Auxiliary lenses of any desired character may be used interchangeably, or the auxiliary lens may be removed and the attachment employed for moderately close-up work to overcome parallax merely. The use of the attachment when provided with a magnifying auxiliary lens for copying and for photographing small objects is particularly convenient. However the attachment is equally useful when employed with an auxiliary lens to give telephoto effects, for focusing and determining the field of view of the camera with its lens equipment thus modified.

Having thus described my invention, I claim:

1. In combination, a camera having a focusing lens and a taking lens spaced apart vertically, a bracket having a horizontal leg and a vertical leg, said horizontal leg having a tripod socket, said vertical leg having an opening therein for the reception of an auxiliary lens, an operative connection between the base of the camera and said horizontal leg for moving the camera vertically to dispose either said focusing lens or said taking lens directly behind said auxiliary lens, and stop means for limiting said vertical movement.

2. Apparatus as defined in claim 1, comprising means for locking said operative connection in either of its extreme positions.

3. In combination, a bracket having a horizontal leg and a vertical leg, said horizontal leg having a tripod socket, said vertical leg having an opening therein for the reception of an auxiliary lens, a plate parallel to said horizontal leg, a tripod screw carried by said plate for connection with the base of a twin lens reflex camera, and an operative connection between said horizontal leg and said plate including stop means adapted to permit movement of said plate a predetermined distance toward and away from said horizontal leg, whereby either of the camera lenses may be brought into alignment with said auxiliary lens.

4. In combination, a bracket having a horizontal leg and a vertical leg, said horizontal leg having a tripod socket, said vertical leg having an opening for the reception of an auxiliary lens, a plate parallel to said horizontal leg, a tripod screw carried by said plate for connection with the base of a twin lens reflex camera, an operative connection between said horizontal leg and said plate comprising at least one pair of cross arms pivoted together intermediate their ends, adjacent extremities of said arms being pivoted to said horizontal leg and to said plate, pin and slot joints connecting said horizontal leg and said plate with the opposite ends of said arms for maintaining said plate parallel with said horizontal leg, and stop means for limiting the movement of said operative connection.

5. Apparatus as defined in claim 4, wherein the ends of the slots of said pin and slot joints form the said stop means to limit camera movement upwardly and downwardly.

HOMER S. McCULLOUGH.

REFERENCES CITED

The following references are of record in the file of this patent:

UNITED STATES PATENTS

| Number | Name | Date |
|---|---|---|
| 906,222 | Hall | Dec. 8, 1908 |
| 1,863,891 | Zuber | June 21, 1932 |
| 1,892,846 | Mueller | Jan. 3, 1933 |
| 1,955,170 | Bornmann | Apr. 17, 1934 |
| 1,996,481 | Morgan | Apr. 2, 1935 |
| 2,004,807 | Fassin | June 11, 1935 |
| 2,124,286 | Burckhardt | July 19, 1938 |
| 2,170,959 | Bartels et al. | Aug. 29, 1939 |
| 2,187,709 | Foy | Jan. 16, 1940 |
| 2,194,523 | Sauer et al. | Mar. 26, 1940 |
| 2,277,448 | Munsinger | Mar. 24, 1942 |
| 2,326,657 | Johnston | Aug. 10, 1943 |

FOREIGN PATENTS

| Number | Country | Date |
|---|---|---|
| 609,962 | Germany | Mar. 5, 1935 |